United States Patent [19]
Inamoto et al.

[11] 3,821,275
[45] June 28, 1974

[54] METHOD OF PRODUCING 1,3-BIS (CYANOMETHYL) ADAMANTANE

[75] Inventors: Yoshiaki Inamoto, Wakayama; Takeji Kadono, Kainan, both of Japan

[73] Assignee: Kao Soap Co. Ltd., Tokyo, Japan

[22] Filed: Apr. 3, 1972

[21] Appl. No.: 240,760

[30] Foreign Application Priority Data
June 24, 1971    Japan.............................. 46-45901

[52] U.S. Cl. ....... 260/464, 260/77.5 AT, 260/78 R, 260/453 AP, 260/557 B
[51] Int. Cl. .......................................... C07c 121/46
[58] Field of Search ................................... 260/464

[56] References Cited
UNITED STATES PATENTS
2,037,389   4/1936   Nicodemus et al............. 260/465.2
2,502,412   4/1950   Ardis............................ 260/465.2 X
3,624,126   11/1971  Narayanan..................... 260/464
3,748,359   7/1973   Thompson..................... 260/464 X OTHER PUBLICATIONS
Lauria, et al., Index chemicus, 27, p. 87581 (1967).

Primary Examiner—Joseph P. Brust
Attorney, Agent, or Firm—Woodhams, Blanchard & Flynn

[57] ABSTRACT

1,3-Bis(cyanomethyl) derivatives of adamantane and alkyladamantanes are prepared by a one-step reaction of (1) the corresponding 1,3-bis(carboxymethyl) derivatives of adamantane and alkyladamantanes with (2) ammonia, in the presence of catalyst, at an elevated temperature. The compounds are useful as starting materials for producing various types of synthetic resins.

2 Claims, No Drawings

METHOD OF PRODUCING 1,3-BIS(CYANOMETHYL) ADAMANTANE

BACKGROUND OF THE INVENTION

1. Field of the Invention

This invention relates to 1,3-bis(cyanomethyl)adamantanes and methods of preparing same.

The nitriles produced by the present method are novel substances that have not been synthesized before, and are very useful as starting materials for the production of various products.

2. Summary of the Invention

The present invention provides 1,3-bis(cyanomethyl) derivatives of adamantane and alkyladamantanes having the formula

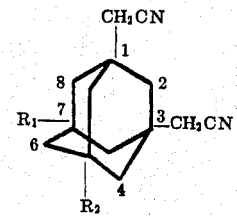

wherein $R_1$, $R_2$ are hydrogen or an alkyl having from one to four carbon atoms, respectively.

Also, the present invention relates to the preparation of 1,3-bis(cyanomethyl)adamantane and -alkyladamantanes by the reaction of the corresponding 1,3-bis(carboxymethyl) derivatives of adamantane and alkyladamantanes with ammonia, in the presence of catalyst.

According to the method of present invention, the two carboxyl groups of the starting material are converted into cyano groups in one and the same reaction without isolating intermediates.

Thus, the present invention provides a new method of producing 1,3-bis(cyanomethyl) derivatives of adamantane compounds. 1,3-Bis(cyanomethyl)adamantane and -alkyladamantanes produced by the present method are very useful substances as starting materials for the production of various intermediates and end products, because of their unique properties owing the presence of the adamantane ring and the two reactive cyano groups.

For example, diamines or diisocyanates derived from these nitriles by conventional methods give polyamides, polyurethanes and epoxy resins having very good heat stability and fastness to light and weathering. These resins can be used for various purposes, for example, to make moldings or as coatings, adhesives, fiber treating compositions, etc.

We have studied the synthesis and reaction of the known materials 1,3-bis(carboxymethyl)adamantane and -alkyladamantanes, and have discovered that 1,3-bis(carboxymethyl) derivatives of adamantanes react with ammonia, in the presence of catalyst, to give dinitriles.

Thus, this invention provides a convenient and advantageous method of preparing 1,3-bis(cyanomethyl)adamantane and -alkyladamantanes of the formula (I) by the reaction of (1) the corresponding dicarboxylic acid having the formula

(II)

wherein Ad has the same meaning as in formula (I), with (2) gaseous ammonia, at an elevated temperature, in the presence of catalyst.

As examples of ring-substituted alkyladamantanes represented by "Ad" in the formulas I and II, there can be cited 5-methyl-, 5-ethyl-, 5,7-dimethyl-, 5-methyl-7-ethyl-, and 5,7-diethyl-substituted adamantanes.

The method of producing the dinitriles of the formula I comprises passing dry ammonia gas through a mixture of molten 1,3-bis(carboxymethyl)adamantane or -alkyladamantane of the formula II and the catalyst, while continuously distilling off the water produced during the reaction period.

The reactivities in this reaction of the two carboxyl groups in the 1,3-bis(carboxymethyl)adamantane compounds of the formula II are the same, thus indicating that the two carboxyl groups are separated far enough to be electronically as well as sterically independent of each other. Therefore, it is unnecessary to provide different reaction conditions for the first and the second carboxyl groups, and the reaction can be carried out smoothly in one and the same step.

Moreover, the presence of alkyl substituents on the adamantane ring does not affect the reactivity of the carboxyl groups, and, therefore, the reaction conditions do not need to be altered substantially, depending on the presence or absence of alkyl substituents on the adamantane ring.

The catalyst which can be used effectively for the reaction of this invention includes all of the known, so-called, dehydration catalysts, for example, metal oxides such as alumina, silica, thorium oxide, manganese oxide, and zinc oxide, minerals such as pumice, clay, and kieselguhr, and Lewis acids such as zinc chloride, ferric chloride and aluminum chloride.

Furthermore, mixtures of the above catalysts, for example, zinc oxide-alumina, zinc oxide-silica gel, and zinc chloride-acid clay, also exhibit desirable and effective catalytic activity.

The amount of the catalyst used in this reaction is in the range of from 0.0001 to 0.01 mol of catalyst, preferably 0.001–0.01 mol, per each mol of the dicarboxylic acid starting material.

The reaction temperature in this reaction is in the range of from 200° to 400° C., preferably from 270° to 340° C.

When an effective catalyst and suitable amount thereof, and the reaction temperature, are selected and used as described above, the reaction of this invention can be completed within 15 hours.

In carrying out the reaction according to the present invention, it is sometimes preferred to use a high boiling point, inert solvent, for example, xylene, alkylbenzene, trimethylenenorbornane and paraffin hydrocarbons. As adamantane dicarboxylic acids are highly sublimable, loss of adamantane compounds due to sublimation may be substantial when the reaction is carried out in the stream of gaseous ammonia. The sublimation of adamantane compounds, however, can be prevented very effectively by the use of inert solvents as described above.

An illustrative example of this invention is set forth below. In the example, the melting point is not cor-

EXAMPLE I

Preparation of 1,3-bis(cyanomethyl)adamantane (III)

A mixture of 50.0 parts of 1,3-bis(carboxymethyl)adamantane, 0.25 parts of zinc oxide, and 0.5 parts of active alumina was heated gradually. After the temperature reached 260°, by which time the adamantane compound was melted, dry ammonia gas was begun to be passed into the melt at the rate of 0.2–0.3 l/min. The temperature of the melt was further raised to 300°–310° C. and the mixture was stirred and maintained at that temperature during a reaction period of 7 hours, while continuing to pass dry ammonia gas through the melt and distilling off the water produced during the reaction period. The reaction mixture was allowed to cool to room temperature and then 200 parts of volume of benzene were added to dissolve the solidified product, and the benzene solution was filtered to remove the suspended catalyst.

The benzene solution was then fractionated, and the fraction boiling at 164°–167° C. (0.35 mm.) was collected to give 37.5 parts (88.3 percent yield) of III, a colorless solid.

The 1,3-bis(cyanomethyl)adamantane (III) obtained by the above procedure has a purity of 99.1 percent without further purification, as determined by vapor phase chromatography (column (15 mm. × 3 m.), packed with Chromosorb W-AW containing 30 percent SE-30; column temperature, 200° C.; Helium flow rate, 60 ml./min.), and has the following physical properties.

Melting point: 73–74° C.
Analysis:
  Found: C, 78.8; H, 8.2; N, 12.8%.
  Calculated for $C_{14}H_{18}N_2$: C, 78.46; H, 8.47; N, 13.07%.
IR spectrum (KBr pellet, $cm^{-1}$)
  2900 (VS), 2850 (VS): $\nu_{C-H}$
  2220 (S): $\nu_{C\equiv N}$
  1440 (S), 1420 (S), 1360 (m), 1340 (S), 1320 (m): $\sigma_{C-H}$
NMR spectrum ($CSCl_3$ solution, TMS as internal standard, $\tau$)
  7.78 (S, 6H); $-CH_2CN$ & $H\gamma$
  8.40 (d, J = 2$H_z$, 12H): $H\beta$ & $H\delta$
Mass spectrum (m/e relative intensity, %)
  214 (0.2): parent peak
  175 (14) : $(Ad^+-CH_2CN) + 1$
  174 (100): $Ad^+-CH_2CN$ The embodiments of the invention in which an exclusive property or privilege is claimed are defined as follows:

1. A compound of the formula

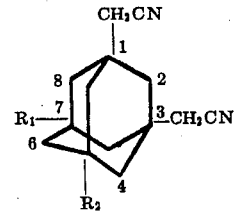

wherein $R_1$, $R_2$ are hydrogen or an alkyl having from one to four carbon atoms, respectively.

2. A compound according to claim 1, selected from the group consisting of 5,7-dihydrogen-, 5-methyl-, 5-ethyl-, 5,7-dimethyl-, 5-methyl-7-ethyl- and 5,7-diethyl-substituted compounds.

* * * * *